US012774052B2

(12) United States Patent
Shimizu et al.

(10) Patent No.: US 12,774,052 B2
(45) Date of Patent: Oct. 27, 2026

(54) COWLING STRUCTURE

(71) Applicant: SUZUKI MOTOR CORPORATION, Hamamatsu (JP)

(72) Inventors: Yuki Shimizu, Hamamatsu (JP); Shunichi Tsujimura, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 330 days.

(21) Appl. No.: 18/397,111

(22) Filed: Dec. 27, 2023

(65) Prior Publication Data

US 2024/0262446 A1 Aug. 8, 2024

(30) Foreign Application Priority Data

Feb. 2, 2023 (JP) ................................ 2023-014343

(51) Int. Cl.
*B62J 17/02* (2006.01)
*B62J 6/02* (2020.01)

(52) U.S. Cl.
CPC *B62J 17/02* (2013.01); *B62J 6/02* (2013.01)

(58) Field of Classification Search
CPC ............... B62J 17/02; B62J 6/02; B62J 6/055
USPC ........................................................ 296/78.1
See application file for complete search history.

(56) References Cited

U.S. PATENT DOCUMENTS 4,515,405 A 5/1985 Ogishima .................... 296/78.1

FOREIGN PATENT DOCUMENTS

| | | | | | |
|---|---|---|---|---|---|
| EP | 1 759 970 | B1 | | 9/2006 | |
| EP | 3 495 252 | A1 | | 10/2014 | |
| JP | H1071980 | A | * | 3/1998 | ............. B62J 17/02 |
| JP | H 10-147272 | A | | 6/1998 | |
| JP | 2007-261537 | A | | 10/2007 | |
| JP | 2013151177 | A | * | 8/2013 | |
| JP | 2018-052416 | A | | 4/2018 | |
| JP | 2020066408 | A | * | 4/2020 | |

OTHER PUBLICATIONS

Extended European Search Report dated Jun. 6, 2024, issued by the European Patent Office in corresponding application EP 24154523.5.

* cited by examiner

*Primary Examiner* — Amy R Weisberg
*Assistant Examiner* — Philip C Adams
(74) *Attorney, Agent, or Firm* — Stein IP, LLC

(57) ABSTRACT

A cowling structure for a straddle-type vehicle. The cowling structure includes a cowling covering a lamp unit. A front surface of the cowling has an opening through which a lens surface of the lamp unit is exposed to a front side. A lower surface of the cowling has an opening area through which a lower surface of the lamp unit is exposed to a lower side.

7 Claims, 6 Drawing Sheets

COWLING STRUCTURE

CROSS-REFERENCE TO RELATED APPLICATIONS

This application is based on and claims priority under 35 USC 119 from Japanese Patent Application No. 2023-014343 filed on Feb. 2, 2023, the entire content of which is incorporated herein by reference.

TECHNICAL FIELD

The present disclosure relates to a cowling structure.

BACKGROUND ART

A straddle-type vehicle such as a motorcycle is known in which a lens surface of a headlamp is surrounded by a front cowling (for example, see JPH10-147272A). A lamp unit is installed inside the front cowling described in JPH10-147272A, and a headlamp is provided on a front surface of the lamp unit. An opening is formed in a front surface of the front cowling, and the lens surface of the headlight is exposed outward through the opening. Although a lower side and lateral sides of the lamp unit are covered by the front cowling, a sufficient gap for improving heat dissipation is secured on the lower side and lateral sides of the lamp unit.

In the straddle-type vehicle described in JPH10-147272A, the front cowling is designed to be high, and the lamp unit is installed at a position higher than a lower surface of the front cowling. For this reason, there is a problem that the center of gravity of a vehicle front portion becomes high and travelling stability decreases.

SUMMARY OF INVENTION

Aspect of non-limiting embodiments of the present disclosure relates to provide a cowling structure that can achieve stable travelling by installing a lamp unit low.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a cowling structure for a straddle-type vehicle, the cowling structure including:

a cowling covering a lamp unit, in which a front surface of the cowling has an opening through which a lens surface of the lamp unit is exposed to a front side, and in which a lower surface of the cowling has an opening area through which a lower surface of the lamp unit is exposed to a lower side.

BRIEF DESCRIPTION OF DRAWINGS

Exemplary embodiment(s) of the present invention will be described in detail based on the following figures, wherein.

DESCRIPTION OF EMBODIMENTS

In a straddle-type vehicle according to one aspect of the present disclosure, a lamp unit is covered with a cowling. A front surface of the cowling has an opening through which a lens surface of the lamp unit is exposed to a front side, and a lower surface of the cowling has an opening area through which a lower surface of the lamp unit is exposed to a lower side. Accordingly, by opening the lower surface of the cowling, heat dissipation is sufficiently ensured even when the lamp unit is brought close to the lower surface of the cowling. By installing the lamp unit at a low position, the center of gravity of the vehicle front portion is lowered, and the travelling stability is improved.

Embodiment

Figure 1:
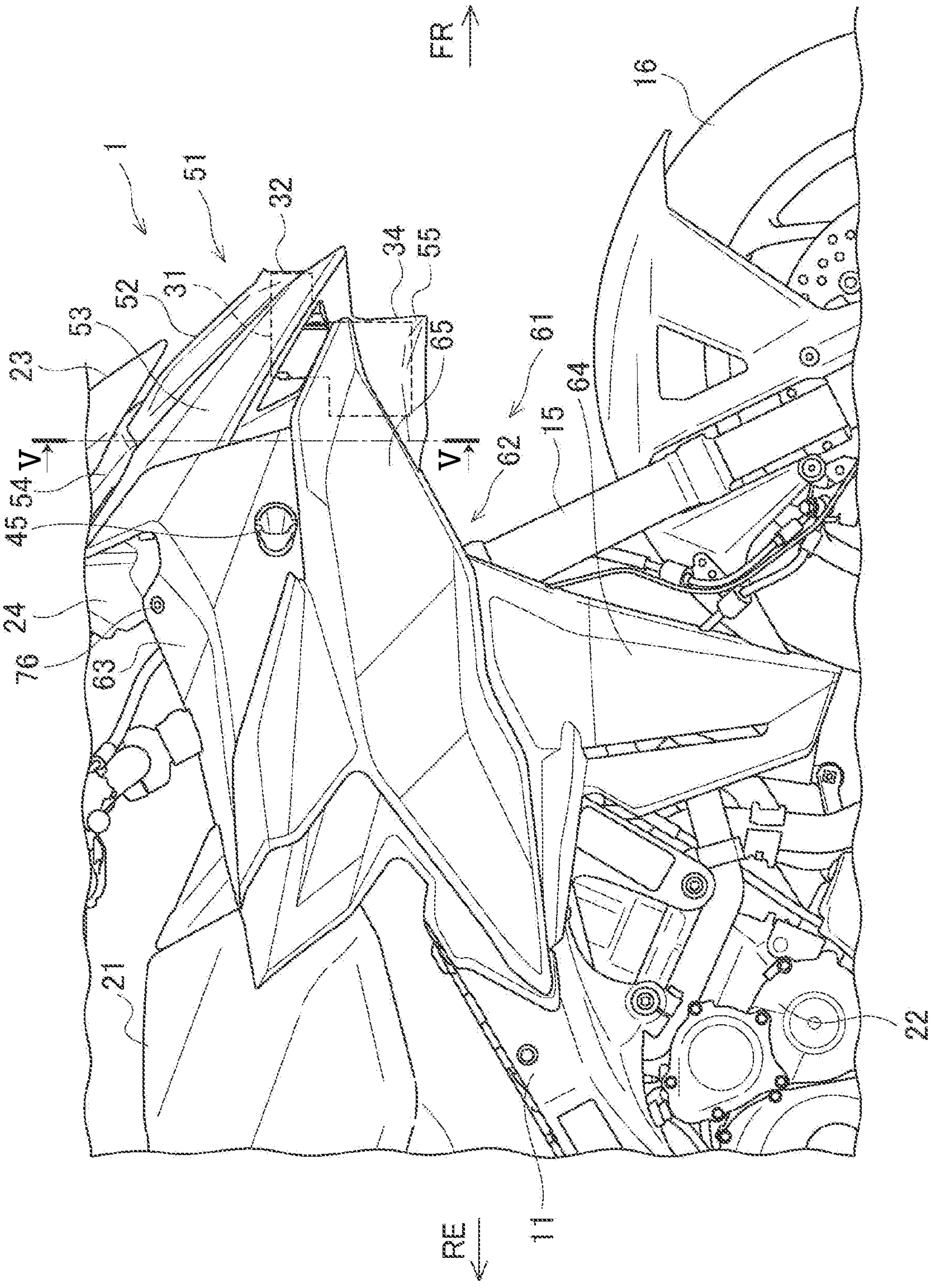
FIG. 1 is a right side view of a vehicle front portion of an exemplary embodiment of the present invention.
Figure 2:
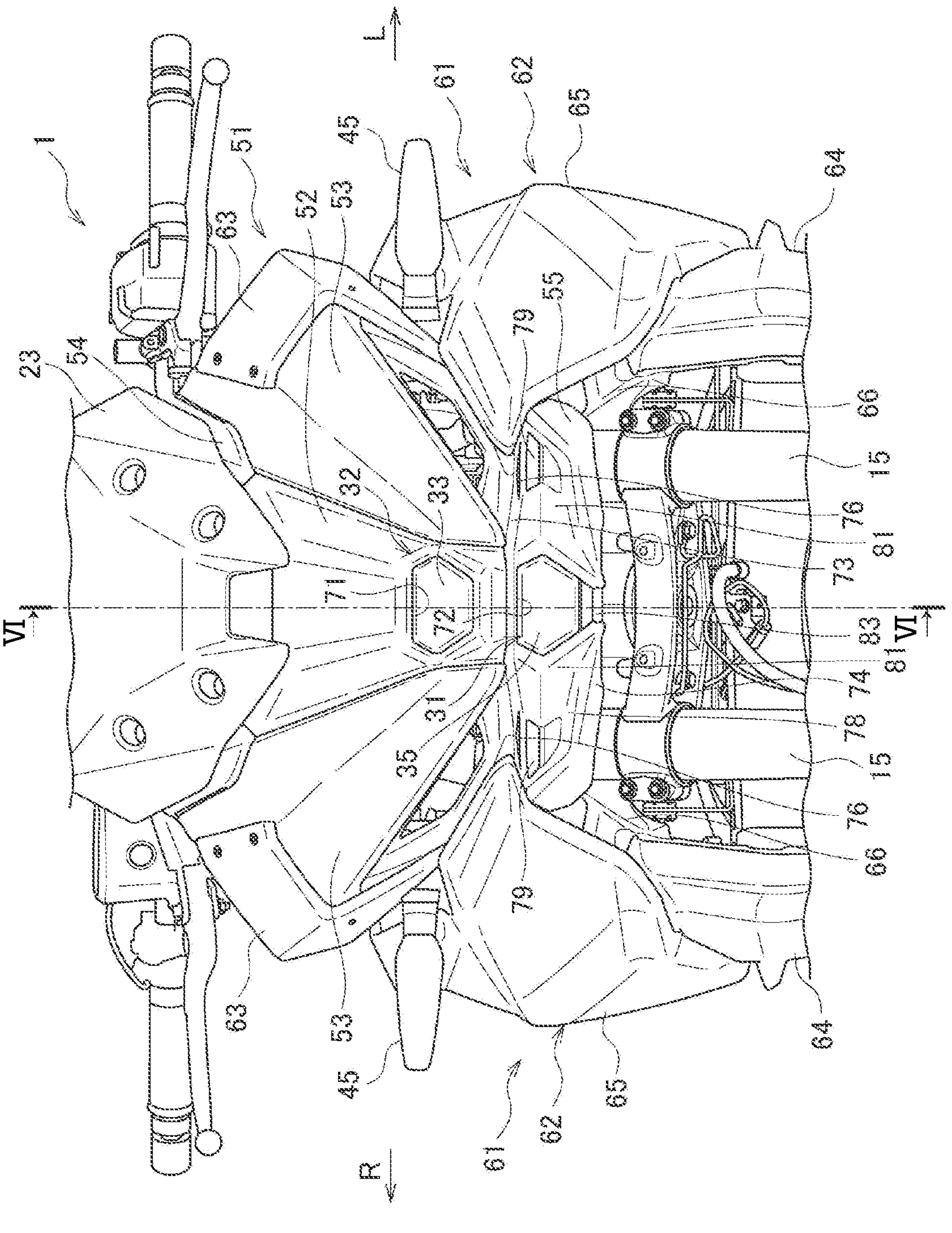
FIG. 2 is a front view of the vehicle front portion of an exemplary embodiment of the present invention.

Hereinafter, a cowling structure according to the present embodiment will be described with reference to the accompanying drawings. FIG. 1 is a right side view of a vehicle front portion of the present embodiment. FIG. 2 is a front view of the vehicle front portion of the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a front cowling (cowling) 51 and a pair of side cowlings 61 are provided at the vehicle front portion of a straddle-type vehicle 1. The vehicle front portion is covered by the front cowling 51 from a front side, and the vehicle front portion is covered by the pair of side cowlings 61 from lateral sides. A front fork 15 protrudes toward a lower side from the side cowling 61, and a front wheel 16 is rotatably supported at a lower portion of the front fork 15. A main frame 11 protrudes toward a rear side from the side cowling 61, a fuel tank 21 is provided on an upper side of the main frame 11, and an engine 22 is provided on the lower side of the main frame 11.

A front end side of the front cowling 51 is formed into a beak shape in a side view. A front surface of the front cowling 51 is inclined obliquely rearward and upward from a front end, and a windscreen 23 for wind protection is attached to the upper side of the front surface of the front cowling 51. A lower surface of the front cowling 51 is formed in two upper and lower stages, and the lower surface on the rear side is one step lower than the lower surface on the front side of the front cowling 51. A meter cover 24 is attached to the rear side of the front cowling 51. A headlamp unit (lamp unit) 31 includes an upper headlamp 32 and a lower headlamp 34 is positioned inside the front cowling 51.

The pair of side cowlings 61 extends toward the rear side from the front cowling 51 to the front side of the fuel tank 21, and extends toward the lower side from the front cowling 51 to the rear side of the front wheel 16. Similarly to the front end side of the front cowling 51, a front end side of each side cowling 61 (outer middle cowling 65) is also formed into a beak shape in side view. The upper side of a front edge of each side cowling 61 is inclined obliquely upward and rearward from a front end, and the lower side of the front edge of each side cowling 61 is inclined obliquely downward and rearward from the front end. The pair of side cowlings 61 are connected to the rear side of the front cowling 51, and a streamline shape that reduces air resistance from traveling wind is formed at the vehicle front portion of the straddle-type vehicle 1.

As shown in FIGS. 1 and 2, the center of the front surface of the front cowling 51 is formed by a front center cowling 52, and both left and right sides of the front surface of the front cowling 51 are formed by a pair of front side cowlings 53. The upper side of the front surface of the front cowling 51 is formed by a front upper cowling 54, and the lower side of the front surface of the front cowling 51 is formed by a front lower cowling 55. A lens surface 33 of the upper headlamp 32 is exposed to the front side through an opening of the front center cowling 52. A lens surface 35 of the lower headlamp 34 is exposed to the front side through an opening of the front lower cowling 55.

An outer surface of each of the pair of side cowlings 61 is formed by an outer cowlings 62. An inner surface of each of the pair of side cowlings 61 is formed by an inner cowlings 66. The outer cowling 62 is formed by combining an outer upper cowling 63, an outer lower cowling 64, and an outer middle cowling 65. A turn signal lamp 45 protrudes laterally from the outer upper cowling 63. The outer cowling 62 and the inner cowling 66 are overlapped in a left-right direction to form each side cowling 61 hollow. A space for accommodating electrical components is secured inside each side cowling 61.

In the straddle-type vehicle 1 described above, the front end of the front cowling 51 is positioned high in order to protect the occupant from traveling wind. The headlamp unit 31, which is a heavy object, is located inside the front cowling 51, but in consideration of travelling stability, it is desirable to install the headlamp unit 31 low. On the other hand, if a lower side of the headlamp unit 31 is covered with the front cowling 51, the headlamp unit 31 cannot be located low in order to ensure heat dissipation of the headlamp unit 31. Therefore, in the present embodiment, the lower surface of the front cowling 51 is opened to allow the headlamp unit 31 to be installed at a low position.

Figure 3:
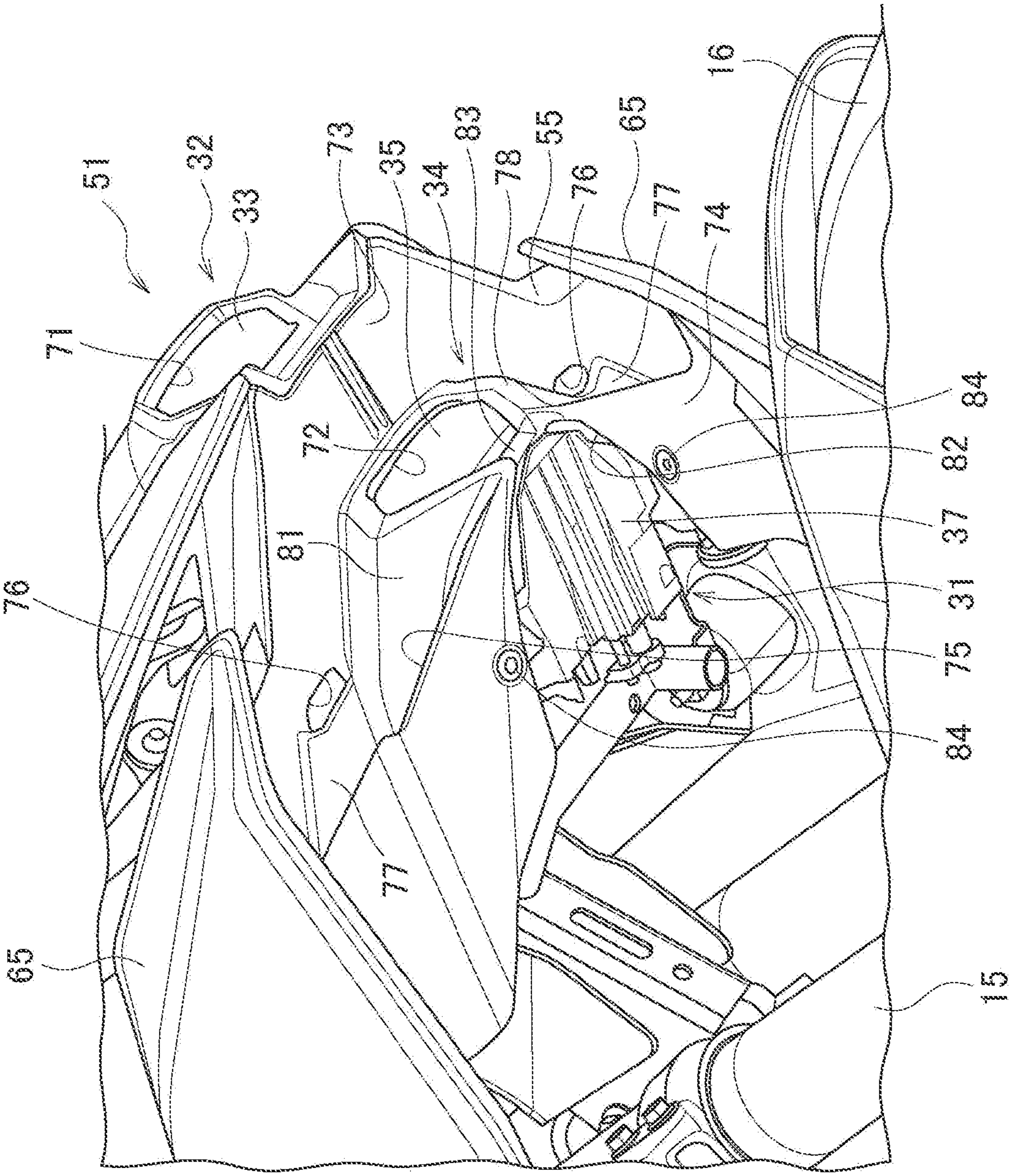
FIG. 3 is a perspective view of the vehicle front portion of an exemplary embodiment of the present invention as viewed obliquely from the lower right.
Figure 4:
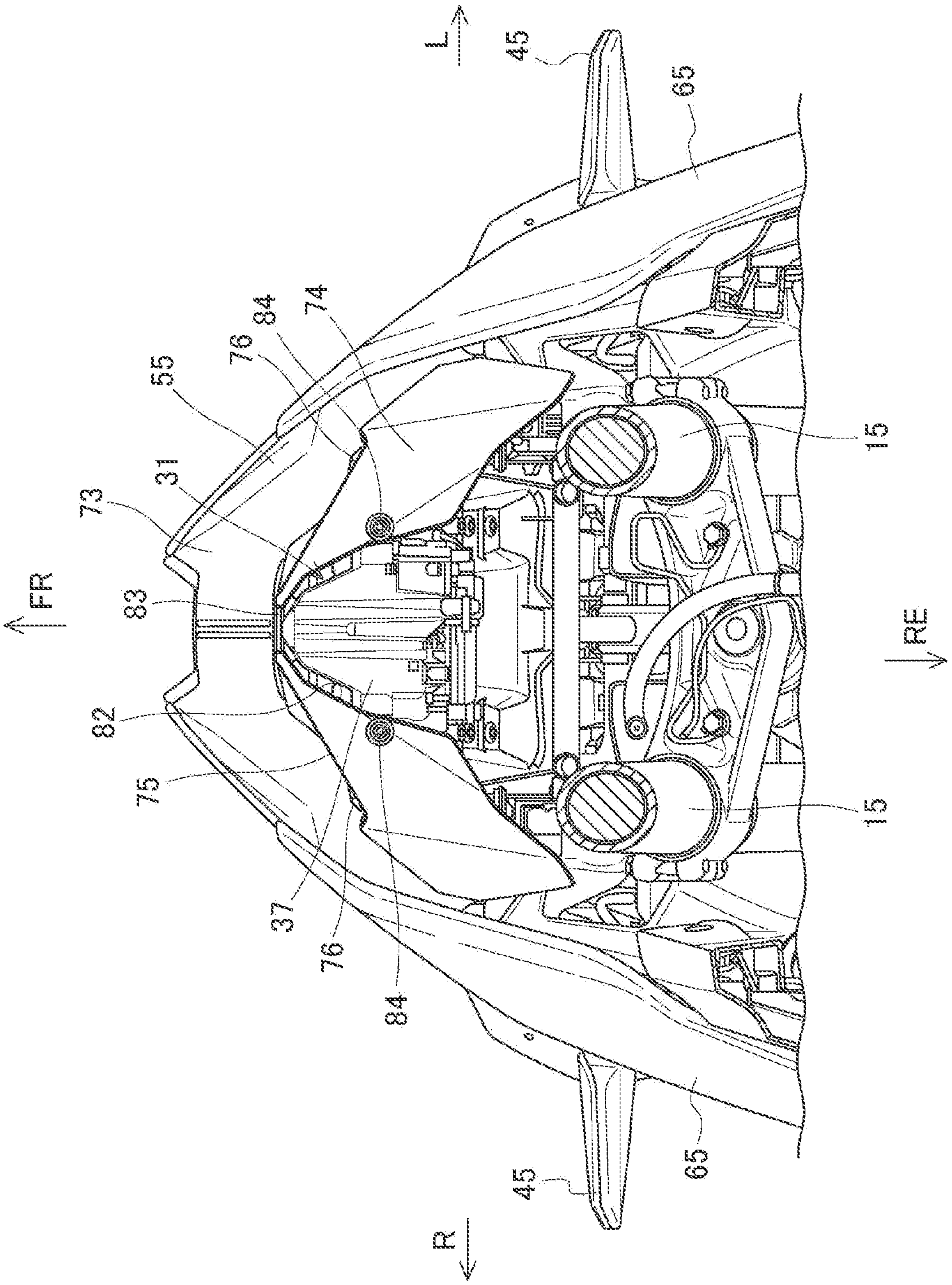
FIG. 4 is a bottom view of the vehicle front portion of an exemplary embodiment of the present invention.
Figure 5:
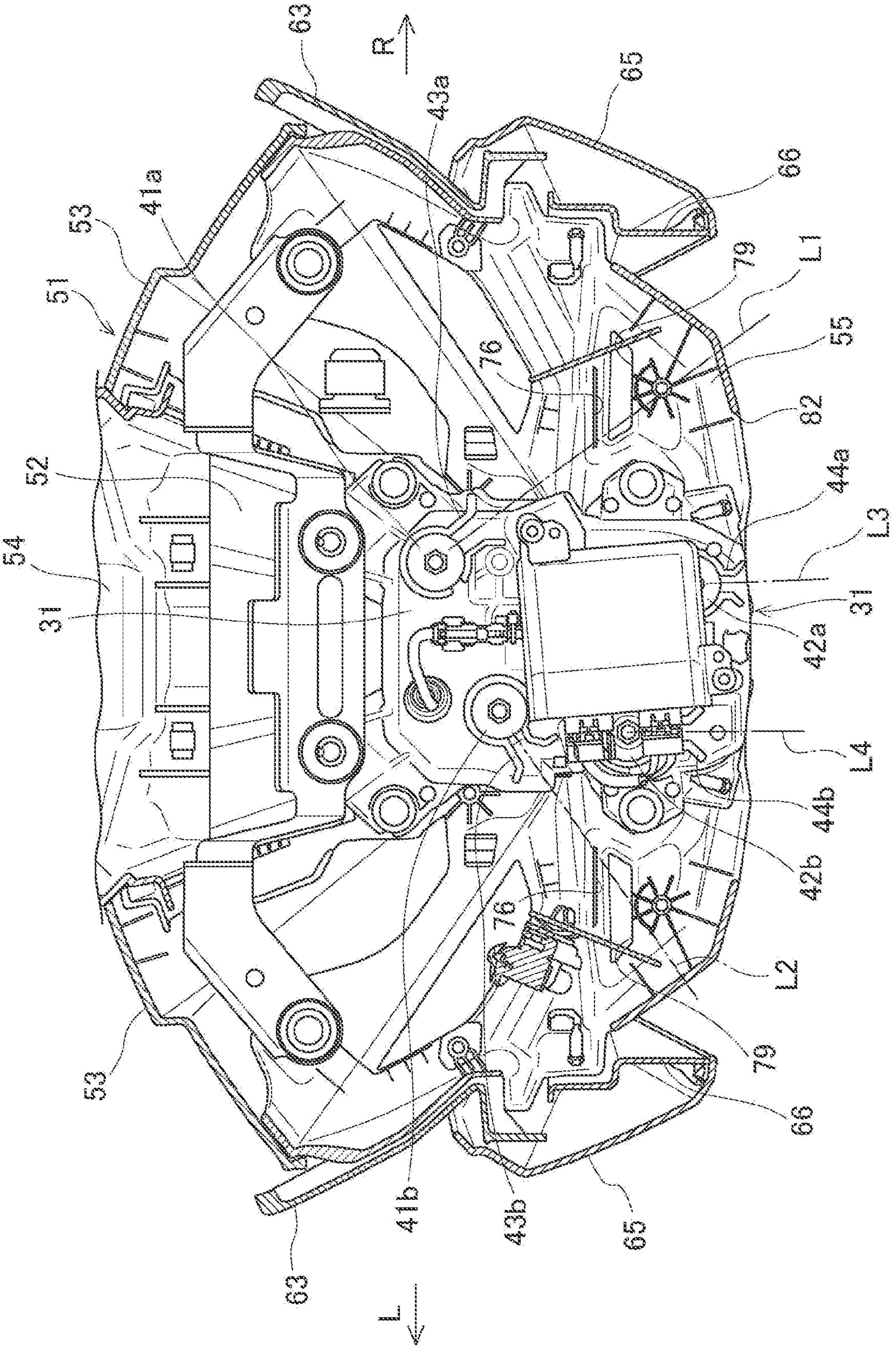
FIG. 5 is a cross-sectional view of the vehicle front portion in FIG. 1 taken along a line V-V.

The cowling structure will be described with reference to FIGS. 2 to 5. FIG. 3 is a perspective view of the vehicle front portion of the embodiment as viewed obliquely from the lower right. FIG. 4 is a bottom view of the vehicle front portion of the embodiment. FIG. 5 is a cross-sectional view of the vehicle front portion in FIG. 1 taken along a line V-V.

As shown in FIGS. 2 and 3, the lens surface 33 of the upper headlamp 32 and the lens surface 35 of the lower headlamp 34 are arranged, along an up-down direction, on the front surface of the front cowling 51. The lens surface 33 of the upper headlamp 32 is exposed to the front side through an opening 71 of the front center cowling 52. The lens surface 35 of the lower headlamp 34 is exposed to the front side through an opening 72 of the front lower cowling 55. A lower surface 74 on a lower stage side of the front lower cowling 55 is located on the rear side than a lower surface 73 on an upper stage side. The lens surface 35 of the lower headlamp 34 is located on the rear side than the lens surface 33 of the upper headlamp 32.

The lower surface 73 on the upper stage side of the front lower cowling 55 is inclined obliquely downward to the rear side (see FIG. 1). A pair of ventilation holes 76 are formed in the lower surface 73 on the upper stage side on outer sides, in a vehicle width direction, of the lower headlamp 34. Even if the lower surface 73 on the upper stage side is inclined obliquely downward to the rear side, an upward force is less likely to be generated in the vehicle front portion since the traveling wind can blow to the rear side through the pair of ventilation holes 76. A protruding portion 77 protrudes downward from the rear side of each of the pair of ventilation holes 76, and the traveling wind easily enters the pair of ventilation holes 76 by the protruding portions 77. The pair of ventilation holes 76 also function as optical axis adjustment holes into which a tool such as a screwdriver is inserted in order to adjust an optical axis of the upper headlamp 32.

A step surface 78 is formed between the lower surface 73 on the upper stage side and the lower surface 74 on the lower stage side of the front lower cowling 55. The lens surface 35 of the lower headlamp 34 is located at the center of the step surface 78. Both sides, in the vehicle width direction, of the step surface 78 are recessed toward the rear side across the lens surface 35, and a pair of ventilation holes 79 are formed on a back surface of the recess of the step surface 78. The pair of ventilation holes 79 are located on the rear side than the pair of ventilation holes 76. Even if traveling wind enters the recess of the step surface 78 of the front lower cowling 55, an upward force is less likely to be generated in the vehicle front portion since the traveling wind can escape to the rear side through the pair of ventilation holes 79.

Further, the pair of ventilation holes 76 and the pair of ventilation holes 79 are located on the rear side than the lens surface 35 of the lower headlamp 34. A side cover 81 is formed on the step surface 78 of the front lower cowling 55 to cover the lower headlamp 34 from a lateral side. The side cover 81 is inclined such that the side cover 81 expand from the lens surface 35 toward the pair of ventilation holes 76 and the pair of ventilation holes 79 and expands to the outer side in the vehicle width direction. The side cover 81 is configured to guide the traveling wind toward the pair of ventilation holes 76 and the pair of ventilation holes 79, and the traveling wind easily flows into the pair of ventilation holes 76 and the pair of ventilation holes 79. Air resistance that the front lower cowling 55 receives from the traveling wind is reduced, and an upward force is less likely to be generated in the vehicle front portion.

As shown in FIGS. 3 and 4, in a bottom view, a part of the lower surface 74 on the lower stage side of the front lower cowling 55 overlaps the pair of ventilation holes 76. Thus, foreign matters such as sand bounced up due to the front wheel 16 hardly enter the pair of ventilation holes 76. Further, a front edge 75 of the lower surface 74 on the lower stage side expands to the outer side in the vehicle width direction from the center in the vehicle width direction toward the rear side. An inner side of the front edge 75 in the vehicle width direction is located on the front side of the pair of ventilation holes 76, and an outer side of the front edge 75 in the vehicle width direction is located on the rear side of the pair of ventilation holes 76. The traveling wind is rectified by the lower surface 74 on the lower stage side, and the pair of ventilation holes 76 can be easily seen from diagonally below, which improves workability of optical axis adjustment work to be described later.

The lower surface 74 on the lower stage side of the front lower cowling 55 has an opening area through which an entire lower surface 37 of the headlamp unit 31 is exposed. That is, the lower surface 74 on the lower stage side of the front lower cowling 55 is cut out (opened) to expose the entire lower surface 37 of the headlamp unit 31. The entire lower surface 37 of the headlamp unit 31 is positioned inside a cutout (opening area) 82 of the lower surface 74 on the lower stage side. The headlamp unit 31 is not covered by the front lower cowling 55 on the lower side, and the lower surface 37 of the headlamp unit 31 is exposed to the lower side, thereby improving heat dissipation. At the front end side of the front cowling 51, the headlamp unit 31, which is a heavy object, is positioned inside the cutout 82 of the front lower cowling 55, thereby lowering the center of gravity at the vehicle front portion and improving the travelling stability.

The opening 72 of the front lower cowling 55 is continuous with the cutout 82. The lens surface 35 of the lower headlamp 34 is located low. The front lower cowling 55 is formed with a crossing portion 83 crossing the opening 72 along a lower edge of the lens surface 35 of the lower headlamp 34. The crossing portion 83 is located on the rear side than an opening edge of the front lower cowling 55. The crossing portion 83 hides a step between the lens surface 35 of the headlamp unit 31 and a lamp housing 36 or an interface between components, thereby improving appearance (see FIG. 2). Further, a lower side of the opening 72 of the front lower cowling 55 is connected to the crossing portion 83 to increase the rigidity.

The cutout 82 of the front lower cowling 55 is formed to be wider from the front side toward the rear side. The cutout 82 is the narrowest when viewed from the front side, so that exposure of a lower end of the headlamp unit 31 is reduced to the minimum (see FIG. 2). A pair of fixing portions 84 are provided at both side edges, in the vehicle width direction, of the cutout 82 of the front lower cowling 55. The headlamp unit 31 is fixed to the pair of fixing portions 84. Both side edges, in the vehicle width direction, of the cutout 82 of the front lower cowling 55 are connected via the headlamp unit 31. The headlamp unit 31 functions as a bridge, and the rigidity of the cutout lower surface 74 of the front lower cowling 55 is increased.

In the headlamp unit 31 shown in FIG. 5, a lower half portion protrudes to the rear side than an upper half portion of the lamp housing 36. On a back surface of the upper half portion of the lamp housing 36, an upper optical axis adjustment portion 41*a* is provided near an upper right corner, and an upper optical axis adjustment portion 41*b* is provided near the center on the left side. On a back surface of the lower half portion of the lamp housing 36, a lower optical axis adjustment portion 42*a* is provided near a lower right corner, and a lower optical axis adjustment portion 42*b* is provided near the center on the left side. The optical axis of the upper headlamp 32 is adjusted in the upper-lower and left-right directions by the upper optical axis adjustment portions 41*a* and 41*b*. An optical axis of the lower headlamp 34 is adjusted in the upper-lower and left-right directions by the lower optical axis adjustment portions 42*a* and 42*b*.

The upper optical axis adjustment portions 41*a* and 41*b* is configured to receive an operation with a tool (not shown) through the pair of ventilation holes 76. The lower optical axis adjustment portions 42*a* and 42*b* is configured to receive an operation with a tool through the cutout 82. Upper tool guides 43*a* and 43*b* are provided around the upper optical axis adjustment portions 41*a* and 41*b*. The upper tool guides 43*a* and 43*b* restrict an insertion direction of the tools onto tool lines connecting the pair of ventilation holes 76 and the upper optical axis adjustment portions 41*a* and 41*b*. Lower tool guides 44*a* and 44*b* are provided around the lower optical axis adjustment portions 42*a* and 42*b*. The lower tool guides 44*a* and 44*b* restrict the insertion direction of the tools onto tool lines connecting the cutout 82 and the lower optical axis adjustment portions 42*a* and 42*b*.

In a case where the tool is inserted from the pair of ventilation holes 76, a tip end of the tool is guided to the upper optical axis adjustment portions 41*a* and 41*b* by the upper tool guides 43*a* and 43*b*. In a case where the tool is inserted from the cutout 82, a tip end of the tool is guided to the lower optical axis adjustment portions 42*a* and 42*b* by the lower tool guides 44*a* and 44*b*. This facilitates the optical axis adjustment work of the upper headlamp 32 and the lower headlamp 34. The pair of ventilation holes 76 serve as optical axis adjustment holes of the upper optical axis adjustment portions 41*a* and 41*b*, and the cutouts 82 serve as optical axis adjustment holes of the lower optical axis adjustment portions 42*a* and 42*b*. Therefore, there is no need to add an optical axis adjustment hole to the front cowling 51, and the appearance of the straddle-type vehicle 1 is improved.

A common cowlings is manufactured by injection molding, in which a mold is filled with a molten resin. The mold is formed with a protruding portion that corresponds to a hole shape of the cowling. When the mold is filled with a molten resin, the molten resin branches to avoid the protruding portion, and the molten resin that has gone around the protruding portion joins together and forms a weld line. For this reason, as the number of holes in the cowling increases, many weld lines appear on the appearance of the unpainted cowling. Since the number of holes of the front lower cowling 55 of the present embodiment is reduced to the minimum, the number of weld lines of the front lower cowling 55 is reduced, so that the appearance of the straddle-type vehicle 1 is improved.

Figure 6:
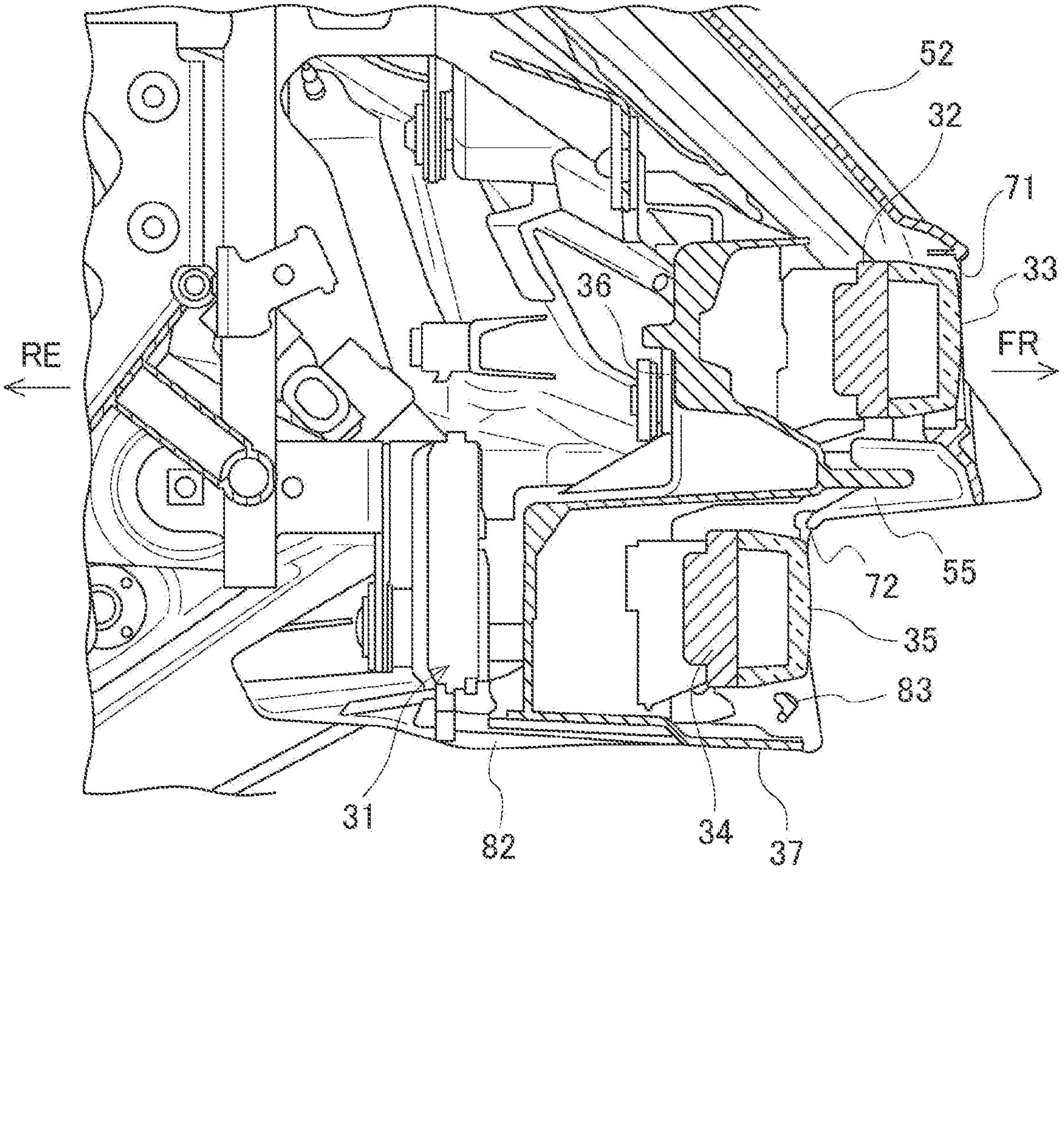
FIG. 6 is a cross-sectional view of the vehicle front portion in FIG. 2 taken along a line VI-VI.

A positional relationship between the lamp unit and the front cowling will be described with reference to FIG. 6. FIG. 6 is a cross-sectional view of the vehicle front portion in FIG. 2 taken along a line VI-VI.

As shown in FIG. 6, the headlamp unit 31 is located inside the front center cowling 52 and the front lower cowling 55. The lamp housing 36 of the headlamp unit 31 is formed in a stepped shape, the upper headlamp 32 is attached to an upper stage of the lamp housing 36, and the lower headlamp 34 is attached to a lower stage of the lamp housing 36. The lens surface 33 of the upper headlamp 32 is positioned inside the opening 71 of the front center cowling 52. The lens surface 35 of the lower headlamp 34 is positioned inside the opening 72 of the front lower cowling 55.

The lower surface 74 of the front lower cowling 55 is cut out, and the lower surface 37 of the lamp housing 36 is positioned inside the cutout 82. Therefore, the lower surface 37 of the lamp housing 36 is exposed to a space above the front wheel 16 (see FIG. 1). Since traveling wind enters the space above the front wheel 16, the heat dissipation of the headlamp unit 31 is improved by the traveling wind. The lower surface 37 of the lamp housing 36 protrudes to the front side than the crossing portion 83 of the front lower cowling 55. The lower headlamp 34 is covered with the lower surface 37 of the lamp housing 36 from below. The lower headlamp 34 is protected by the lamp housing 36 from foreign matters bounced up due to the front wheel 16.

Since the lower surface 37 of the lamp housing 36 is positioned inside the cutout 82 of the front lower cowling 55, the headlamp unit 31 is positioned low, and the center of gravity at the vehicle front portion is lowered. At this time, a height of a front side of the lower surface 37 of the lamp housing 36 is aligned with a height of the cutout 82 of the front lower cowling 55. The lower surface 37 of the lamp housing 36 is located to complement the cutout 82 of the front lower cowling 55. The lower surface 37 of the lamp housing 36 is recognized as the front lower cowling 55, and the design is improved. Further, weight and cost can be reduced by an amount corresponding to the cutout of the front lower cowling 55.

As described above, according to the cowling structure of the present embodiment, the lower surface 74 of the front lower cowling 55 is cut out, so that even when the headlamp unit 31 is brought close to the lower surface 74 of the front lower cowling 55, sufficient heat dissipation is ensured. By installing the headlamp unit 31 at a low position, the center of gravity of the vehicle front portion is lowered, and the travelling stability is improved.

In the present embodiment, the front cowling is formed by combining a plurality of cowling members. Alternatively, the front cowling may be formed by one cowling member.

Further, in the present embodiment, the outer cowling is formed by combining a plurality of cowling members. Alternatively, the outer cowling may be formed by one cowling member.

Further, in the present embodiment, the lamp unit includes the upper headlamp and the lower headlamp. Alternatively, the lamp unit may be a single headlamp.

Further, in the present embodiment, the cowling is a front cowling, and the lamp unit is a lamp unit for a headlamp. Alternatively, the cowling may be a rear cowling, and the lamp unit may be a rear combination lamp. In this case, by installing the rear combination lamp at a low position, the center of gravity of a vehicle rear portion is lowered, and the travelling stability is improved.

Further, in the present embodiment, the opening area is formed by cutting out the lower surface of the front cowling. Alternatively, the opening area of the lower surface of the front cowling may have any shape as long as the lower surface of the lamp unit can be exposed to the lower side. For example, the opening area may be formed by opening the lower surface of the front cowling.

Further, in the present embodiment, the lower surface of the front cowling is cut out to expose an entire lower surface of the lamp unit to the lower side. Alternatively, the lower surface of the front cowling may be opened to expose a part of the lower surface of the lamp unit to the lower side. Even in such a configuration, the heat dissipation of the lamp unit is improved, so that the lower surface of the lamp unit can be brought close to the lower surface of the front cowling to lower the center of gravity of the vehicle front portion.

Further, in the present embodiment, the cutout in the lower surface of the front cowling is formed to be wider from the front side toward the rear side. Alternatively, the shape of the opening area of the front cowling is not particularly limited as long as the lower surface of the lamp unit can be exposed to the lower side.

Further, in the present embodiment, the lower surface of the front cowling is formed in two upper and lower stages. Alternatively, the lower surface of the front cowling may not be formed in a stepped shape.

Further, in the present embodiment, the front cowling is formed by the front center cowling, the pair of front side cowlings, the front upper cowling, and the front lower cowling. Alternatively, the front cowling may be formed by six or more cowlings.

Further, the cowling structure according to the present embodiment is not limited to the above-described straddle-type vehicle, and may be used in other types of straddle-type vehicles. The straddle-type vehicle is not limited to a general vehicle in which a driver rides on a seat in a posture of straddling the seat, and includes a scooter-type vehicle in which the driver rides on the seat without straddling the seat.

As described above, a first aspect relates to a cowling structure for a straddle-type vehicle (1), the cowling structure including: a cowling (front cowling 51) covering a lamp unit (headlamp unit 31), in which a front surface of the cowling has an opening through which a lens surface (35) of the lamp unit is exposed to a front side, and a lower surface (74) of the cowling has an opening area through which a lower surface (37) of the lamp unit is exposed to a lower side. According to this configuration, by opening the lower surface of the cowling, heat dissipation is sufficiently ensured even when the lamp unit is brought close to the lower surface of the cowling. By installing the lamp unit at a low position, the center of gravity of the vehicle front portion is lowered, and the travelling stability is improved.

A second aspect is directed to the first aspect, in which an entire lower surface of the lamp unit is exposed through the opening area, and the entire lower surface of the lamp unit is positioned inside the opening area (cutout 82) of the cowling. According to this configuration, the entire lower surface of the lamp unit is positioned inside the opening area of the cowling, so that the lamp unit is installed at a lower position.

A third aspect is directed to the first or second aspect, in which the opening of the cowling and the opening area of the cowling are continuous with each other, and the cowling is formed with a crossing portion (83) crossing the opening of the cowling along a lower edge of the lens surface of the lamp unit. According to this configuration, the opening and the opening area of the cowling are continuous with each other, so that the lamp unit is installed at a lower position. The crossing portion hides a step between the lens surface of the lamp unit and a lamp housing or an interface between components, thereby improving appearance.

A fourth aspect is directed to any one of the first aspect to the third aspect, in which both side edges, in a vehicle width direction, of the opening area of the cowling are connected each other via the lamp unit. According to this configuration, the lamp unit functions as a bridge, and the rigidity of the open lower surface of the cowling is increased.

A fifth aspect is directed to any one of the first aspect to the fourth aspect, in which the opening area of the cowling is formed to be wider from the front side to a rear side. According to this configuration, when viewed from the front side, the opening area is the narrowest, and the exposure of a lower end of the lamp unit is reduced to the minimum.

Although the present embodiment has been described, as another embodiment, the above-described embodiment and modification may be combined entirely or partially.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cowling structure for a straddle-type vehicle, the cowling structure comprising:

a cowling covering a lamp unit, wherein a front surface of the cowling has an opening through which a lens surface of the lamp unit is exposed to a front side, wherein a lower surface of the cowling has a cutout forming an opening area through which a lower surface of the lamp unit is exposed to a lower side, wherein the cutout reaches the lens surface of the lamp unit, and wherein a front end of the lower surface of the lamp unit is exposed to the lower side through the opening area.

2. The cowling structure according to claim 1, wherein an entire lower surface of the lamp unit is exposed through the opening area, and wherein the entire lower surface of the lamp unit is positioned inside the opening area of the cowling.

3. The cowling structure according to claim 1, wherein the opening of the cowling and the opening area of the cowling are continuous with each other, and wherein the cowling is formed with a crossing portion crossing the opening of the cowling along a lower edge of the lens surface of the lamp unit.

4. The cowling structure according to claim 1, wherein both side edges, in a vehicle width direction, of the opening area of the cowling are connected each other via the lamp unit.

5. The cowling structure according to claim 1, wherein the opening area of the cowling is formed to be wider from the front side to a rear side.

6. A cowling structure for a straddle-type vehicle, the cowling structure comprising:

a cowling covering a lamp unit, wherein a front surface of the cowling has an opening through which a lens surface of the lamp unit is exposed to a front side, wherein a lower surface of the cowling has a cutout forming an opening area through which a lower surface of the lamp unit is exposed to a lower side, and wherein the cutout reaches the lens surface of the lamp unit, wherein the cowling has a front cowling including a front lower cowling that forms a lower surface of the cowling, wherein the opening area is defined by the cutout formed in the front lower cowling, wherein the lamp unit is positioned inside the cutout at a front end side of the front cowling, and wherein, in a side view of the straddle-type vehicle, a portion of a lower surface of the lamp unit is located below a lower edge of the cutout.

7. The cowling structure according to claim 6, wherein the front lower cowling includes an upper stage lower surface and a lower stage lower surface, a lower surface on the lower stage lower surface is cut out to form a third cutout through which an entire lower surface of the headlamp unit is exposed, wherein an entire lower surface of the headlamp unit is positioned inside the third cutout.

* * * * *